United States Patent
Bourdelais et al.

(10) Patent No.: US 6,273,984 B1
(45) Date of Patent: Aug. 14, 2001

(54) LAMINATION WITH CURL CONTROL

(75) Inventors: Robert P. Bourdelais, Pittsford; Thaddeus S. Gula, Rochester; Peter T. Aylward, Hilton, all of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/198,214

(22) Filed: Nov. 20, 1998

(51) Int. Cl.[7] .......................... B32B 31/08; B32B 31/12; B32B 31/14; B32B 31/30

(52) U.S. Cl. .............................. 156/244.22; 156/244.23; 156/244.24; 156/244.27; 156/282; 156/322; 430/536; 430/538; 430/935

(58) Field of Search ................... 156/244.11, 244.22, 156/244.23, 244.24, 244.27, 282, 322, 324, 280; 430/935, 536, 538

(56) References Cited

U.S. PATENT DOCUMENTS

| | | | |
|---|---|---|---|
| 3,939,025 | * | 2/1976 | Kane ..................................... 156/322 |
| 3,976,528 | * | 8/1976 | James ................................... 156/324 |
| 4,069,081 | * | 1/1978 | Drower et al. ........................ 156/324 |
| 4,187,113 | | 2/1980 | Mathews et al. . |
| 4,300,969 | * | 11/1981 | Frydendal ........................ 156/244.11 |
| 4,389,455 | | 6/1983 | Asao . |
| 4,657,614 | * | 4/1987 | Andersson ............................ 156/324 |
| 4,917,844 | * | 4/1990 | Komai et al. ..................... 156/244.27 |
| 5,244,861 | | 9/1993 | Campbell et al. . |
| 5,290,672 | | 3/1994 | Dunk . |
| 5,387,501 | | 2/1995 | Yajima et al. . |
| 5,466,519 | | 11/1995 | Shirakura et al. . |
| 5,853,965 | * | 12/1998 | Haydock et al. ..................... 430/496 |
| 5,866,282 | | 2/1999 | Bourdelais et al. . |
| 5,874,205 | | 2/1999 | Bourdelais et al. . |
| 5,888,643 | * | 3/1999 | Aylward et al. .................. 428/315.9 |
| 6,030,742 | * | 2/2000 | Bourdelais et al. ................. 430/201 |

FOREIGN PATENT DOCUMENTS

| | | |
|---|---|---|
| 0 880 065 A1 | 11/1998 | (EP) . |
| 0 880 067 A1 | 11/1998 | (EP) . |
| 0 880 069 A1 | 11/1998 | (EP) . |
| 726949 * | 3/1955 | (GB) ............................... 156/244.22 |
| 2 325 749 A | 12/1998 | (GB) . |
| 2 325 750 A | 12/1998 | (GB) . |
| 61-174055 * | 8/1986 | (JP) ................................ 156/244.24 |
| 2-38093 * | 2/1990 | (JP) . |
| 2-50891 * | 2/1990 | (JP) . |
| 3-293349 * | 12/1991 | (JP) . |

* cited by examiner

*Primary Examiner*—Steven D. Maki
(74) *Attorney, Agent, or Firm*—Paul A. Leipold

(57) ABSTRACT

A method of curl control for lamination of a polymer sheet to each side of a core material comprising providing a bottom polymer sheet, bringing said bottom sheet into contact with a heat source, providing said core material, bringing said core material into contact with said bottom polymer sheet while simultaneously applying a binder between said bottom sheet and said core to form a laminate, providing a top polymer sheet, bringing said top sheet into contact with said laminate and while simultaneously applying a binder between said top sheet and said laminate to form a composite wherein each sheet to core modulus ratio is greater than 1 and wherein said composite has a desired curl.

16 Claims, 3 Drawing Sheets

LAMINATION WITH CURL CONTROL

FIELD OF THE INVENTION

This invention relates to printing media. In a preferred form it relates to an improved base for photographic materials.

BACKGROUND OF THE INVENTION

Printing media are improved if they resist curl and remain flat. This is particularly important with media utilized with the formation with color images. Such media include those utilized for ink jet, thermal dye sublimation imaging, thermal wax dye transfer, and electrophotography. The formation of a flat base is particularly important for color photographic paper. In color papers there is a need for providing color papers with improved curl. Present color papers will curl during development and storage. Such curl is thought to be caused by the different properties of the layers of the color paper as it is subjected to the developing and drying processes. Humidity changes during storage of color photographs lead to curling. There are particular problems with color papers when they are subjected to extended high humidity storage such as at greater than 50% relative humidity. Extremely low humidity of less than 20% relative humidity also will cause photographic papers to curl.

Curl values are the measurement amount of deflection in a parabolically deformed sample. An 8.5 cm diameter round sample of the composite is stored at the test humidity for 21 days. The amount of time required depends on the vapor barrier properties of the laminates applied to the moisture sensitive paper base, and it should be adjusted as necessary by determining the time to equilibrate the weight of the sample in the test humidity. The curl readings are expressed in ANSI curl units, specifically, 100 divided by the radius of curvature in inches.

The radius of curvature is determined by visually comparing the curled shape, sighting along the axis of curl, with standard curves in the background. The curl may be positive or negative, and for photographic products, the usual convention is that the positive direction is curling towards the photosensitive layer. It would be desirable if the humidity curl for photographic print paper could be reduced.

Color print papers are usually made of three structural layers under the emulsion; raw paper base and a top and bottom coating of extrusion cast polyethylene. Since the strength properties of polyethylene in this form are poor in comparison to the raw base, the curl properties or the stiffness of a print in bending are determined almost exclusively by the raw base. Because of the alignment of the paper fibers during manufacturing, the raw base is highly oriented with respect to strength properties in the plane of the sheet, for example the ratio of the elastic modulus in the strongest to weakest direction is often 2:1, with the strongest direction in the MD (machine direction). This is why the shape of a typical polyethylene sample with curl, caused by resisting emulsion shrinkage on one surface at low humidity, is cylindrical with the axis of curl along the MD, so the sample curls in its weakest direction, or directly in the CD (cross direction).

PROBLEM TO BE SOLVED BY THE INVENTION

There remains a need for a base substrate for printing and for photographic use that will resist curl and maintain printed images flat after processing and in storage. There is a particular need for a substrate that will resist changes in planer orientation during humidity changes during the lifetime of the print material.

SUMMARY OF THE INVENTION

It is an object of the invention to provide improved printing materials.

It is a further object to provide printing materials that have resistance to curl during humidity changes.

It is an object of the invention to provide a method of curl control when assembling a composite structure when high strength sheets are not exactly similar in their modulus or thickness.

It is a further object to provide a method of adjusting the curl of an assembled composite structure at the time of assembly that does not require tension control.

These and other objects of the invention are accomplished by a A method of curl control for lamination of a polymer sheet to each side of a core material comprising providing a bottom polymer sheet, bringing said bottom sheet into contact with a heat source, providing said core material, bringing said core material into contact with said bottom polymer sheet while simultaneously applying a binder between said bottom sheet and said core to form a laminate, providing a top polymer sheet, bringing said top sheet into contact with said laminate and while simultaneously applying a binder between said top sheet and said laminate to form a composite wherein each sheet to core modulus ratio is greater than 1 and wherein said composite has a desired curl.

ADVANTAGEOUS EFFECT OF THE INVENTION

The invention provides a method of producing improved imaging elements that resist curling under a variety of conditions. It particularly provides a technique to control the curl of a composite structure at the time of manufacture.

DETAILED DESCRIPTION OF THE INVENTION

Figure 1:
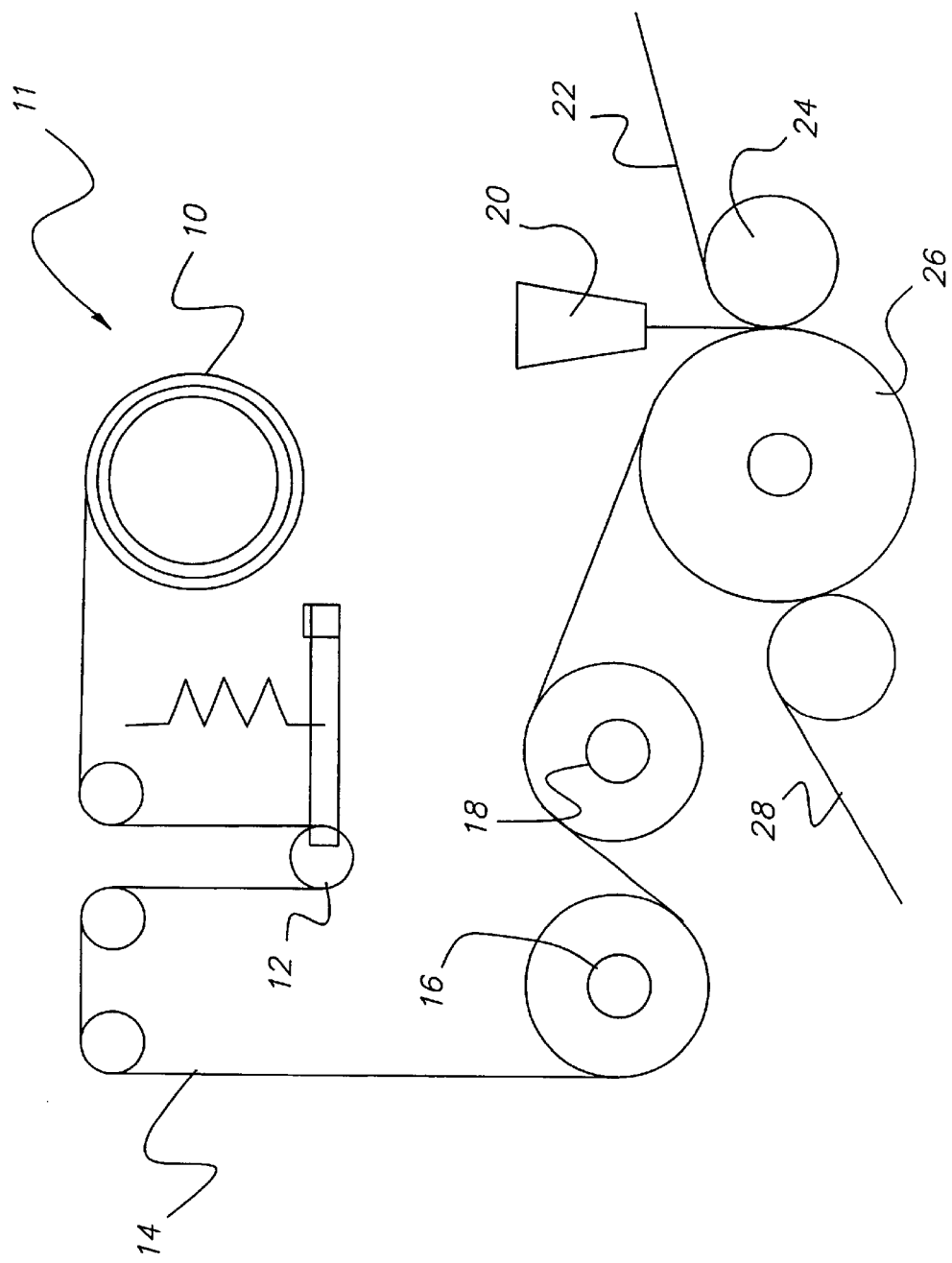
FIG. 1 is an illustration of a process of the invention to control curl by temperature control of the sheet.

The invention has numerous advantages over prior practices in the art. The imaging members of the invention may be thin as the balancing of forces uses thin, strong polymer layers. The imaging members of the invention are more pleasing to the viewer of the image as the image is flat and, therefore, does not have undesirable reflections and distortions caused by viewing of a curled image. The imaging material of the invention further has the advantage that it is easier to process as curling does not occur. Curling can lead to transport difficulties and jamming of the machines required for developing, transporting, and packaging of image material. The photographic paper if curled during the imaging step will result in distorted and out of focus images. This invention provides a method for the control of image curl of the imaging element at the time of manufacture. This allows a variety of products to be manufactured from one design rather than changes in materials that are typical of prior art materials. The laminated imaging base in this invention also has an advantage in the easier feeding of image base material into printers of the electrophotographic, thermal dye transfer, and ink jet printers as imaging element curl will cause paper path jams and reduce the equipment productivity. These and other advantages will be apparent from the detailed description below.

High strength plastic sheets are commonly made by biaxially orienting co-extrusion cast thick (1025 $\mu$m) polyolefins. A typical sheet used in a food packaging application is biaxially oriented polypropylene. It is possible to obtain biaxially oriented polyolefin sheets approximately 26 $\mu$m thick that have been drawn 5× in the MD and then 8× in the CD. The final major strength properties are aligned with the CD and they are 1.8 times that of the MD.

The elastic modulus for these materials is the same order of magnitude as the raw stock, so the layers are very good replacements for the normally weak polyethylene. For biaxially oriented polyolefin sheets with a 5:8 cross direction to machine direction orientation ratio, the primary strength axis is nearly perpendicular to the raw base and therefore it is theoretically possible to pick combinations of the two outside biaxially oriented sheets adhered to the raw base to obtain a combined bending stiffness that is equal in the MD and CD direction. It would be desirable if a base for photographic materials could be constructed from biaxially oriented sheets and cellulose paper to obtain a combined bending stiffness that is equal in the MD and CD direction because equal stiffness in the MD and CD directions are perceptually preferred by consumers.

Curl control in systems of two or more layers is more complicated than producing adequate stiffness to resist surface coatings that cause curl. Multiple layer laminates that have components with strength properties in the same order of magnitude are also sensitive to the stresses that are introduced when the layers are assembled. It has been known that, especially with a laminated product that has high stiffness, the starting curl amount and its direction are controlled somewhat by the tensions used to convey the materials into to the nip where the layers are adhered. For example, if a high strength film layer is adhered to a paper base, the curl of the assembly will have increasing curl values as the tension in the film is increased because the film attaches itself to the paper at a stretched state and, after the bonding is complete and the assembly is not under tension, the film pulls on the paper surface and creates a curled condition. If more layers are attached, the process is repeated and the final assembled curl is the summation of all these effects for each additional layer, and layering is often used on opposite sides to try to keep the total laminates flat.

Consider a three layered structure, film, paper, film, that is required to be flat after assembly. It is apparent that the two outside films can be made of the same materials and thickness and assembled with the same feeding tension to achieve a balance in the CD and MD strains to minimize curl. If, for economic reasons, the outside films are of different thickness and therefore are not matched, it is apparent, that the tensions may need to be increased on the thinner film to achieve the same surface pull force to balance the package.

The invention is accomplished by providing a biaxially oriented polymer sheet on each side of a base paper to form a laminated base. These biaxially oriented sheets on the top and bottom of the base paper are chosen such that they, together with the base paper itself, resist bending under a variety of humidity conditions. The preferred core material is cellulose paper. Cellulose paper is relatively inexpensive and has a high modulus which creates a perceptually preferred stiff photographic member. Biaxially oriented sheets are particularly suitable for resisting bending of the base paper, as they may be engineered during their formation to have selected properties in both the machine and cross direction. This is a result of their being stretched in both directions during formation. For instance, greater stretching in the cross direction during formation of a biaxially oriented sheet will result in a sheet that is stronger in the cross machine direction. Such a polymer sheet, when combined with paper that is weaker in the cross direction, will form a sheet with combined forces that have a strong tendency to keep the laminated sheet flat.

During the lamination process, in which the biaxially oriented sheets are adhered to the base materials, the biaxially oriented sheets are heated or cooled prior to lamination. Heating or cooling causes dimensional changes of the biaxially oriented sheet. After lamination as the sheet returns to ambient temperature conditions causing the imaging support to curl in the direction opposite the dimension change in the biaxially oriented sheet. Because prior art photographic materials utilize low strength melt extruded polyethylene, the polyethylene layer is not sufficiently strong enough to bend the support.

In order to form balanced laminated sheets that will be flat, it is necessary to accurately measure the properties of the base paper and candidate biaxially oriented sheets with respect to their tendency to deflect under load. This is done by measuring the Young's modulus of the sheets of biaxially oriented film and the base paper in at least the machine and cross direction. This measurement is done by determining the stress-strain curve for each material. This testing is ordinarily done by use of an Instron tensile tester. These tests for paper are run at a variety of humidities, as the paper properties change with humidity.

The measurement of the thermal expansion coefficient, having the units of mm/mm-degrees C., is useful in that it measures the ability of a film to change dimension with temperature, materials which have a high number will be more suitable for the purpose of controlling curl with temperature. A polyolefin sheet with a coefficient of thermal expansion greater than 0.00001 mm/mm-degree centigrade is preferred. At coefficient of thermal expansion less than 0.00001 mm/mm-degree centigrade not enough expansion is present to pre stress the sheets prior to lamination.

After the properties of the base paper and biaxially oriented sheets have been determined, there is selected a base paper and films that will have balanced forces to resist curl. This selection process is generally carried out by mathematical modeling. In a simple case, where the package is relatively balanced on each side, the center of bending is assumed to be at the geometric center of the package, and the contribution of each distinct layer to bending stiffness is calculated from the modulus times the moment of inertia of a unit cross section. The moment of inertia of the layers off center must be corrected by the use of the parallel axis theory.

The forces that are created by the thermal expansion or contraction of the films to be laminated are calculated and added to the forces that result from the infeed tension of the films. The forces are mathematically applied against the stiffness of the package to determine the amount of curl using beam bending theory. In the case of unbalanced designs, where the center of bending is not known, or where an extremely accurate solution is required for nonlinear materials, nonlinear finite element analysis can be used.

In the formation of photographic papers, a further factor to consider in formation of a curl resistant product is the properties of the emulsion layers that are placed onto the paper. The emulsion layers apply forces to the paper as they expand and shrink in response to humidity changes. The emulsion forces are also considered in order to create a laminated base that will resist curl at a variety of humidity conditions. The emulsion as it dried after formation shrinks tending to curl the paper bearing the emulsion layer inward, particularly at normal usage conditions at low humidity. The laminated base papers of the invention are designed when used as a photographic base to be practically flat under conditions where an emulsion is present on the surface.

For laminated photographic base materials for use in photographic papers, any suitable combination of base paper and biaxially oriented film properties may be utilized. The preferred biaxially oriented sheets for use in a laminated paper support have a Young's modulus of at least 340 MPa. For biaxially oriented sheets with a Young's modulus less than 300 MPa, the sheets do not have enough strength to offset the curl forces caused by gelatin emulsion imaging layers. The most preferred biaxially oriented sheets for use in laminated paper support have a Young's modulus in the machine direction or cross direction between 690 MPa and 5520 MPa. The base paper preferably has a Young's modulus of 13800 MPa and 2760 MPa in the machine direction and between 6900 MPa and 1380 MPa in the cross direction. A Young's modulus for the paper base below 2700 MPa in the machine direction and 1300 MPa in the cross direction will not provide stiffness for the tactile feel that consumers expect in a high quality photographic reflective image.

The terms as used herein, "top", "upper", "emulsion side", and "face" mean the side or toward the side of the photographic member or image member bearing the imaging layers. The terms "bottom", "lower side", and "back" mean the side or toward the side of the photographic member opposite from the side bearing the photosensitive imaging layers or developed image. The laminated base materials also may be used for the base of for imaging by methods such as ink jet or thermal dye transfer.

Any suitable biaxially oriented polyolefin sheet may be utilized for the sheet on the topside of the laminated base of the invention. Microvoided composite biaxially oriented sheets are preferred and are conveniently manufactured by coextrusion of the core and surface layers, followed by biaxial orientation, whereby voids are formed around void-initiating material contained in the core layer. Such composite sheets are disclosed in, for example, U.S. Pat. Nos. 4,377,616; 4,758,462 and 4,632,869.

The core of the preferred composite sheet should be from 15 to 95% of the total thickness of the sheet, preferably from 30 to 85% of the total thickness. The nonvoided skin(s) should thus be from 5 to 85% of the sheet, preferably from 15 to 70% of the thickness.

The density (specific gravity) of the composite sheet, expressed in terms of "percent of solid density" is calculated as follows:

Composite Sheet Density/Polymer Density×100=% of Solid Density should be between 45% and 100%, preferably between 67% and 100%. As the percent solid density becomes less than 67%, the composite sheet becomes less manufacturable due to a drop in tensile strength and it becomes more susceptible to physical damage.

The total thickness of the top composite sheet can range from 12 to 100 µm, preferably from 20 to 70 µm. Below 20 µm, the microvoided sheets may not be thick enough to minimize any inherent non-planarity in the support and would be more difficult to manufacture. At thickness higher than 70 µm, little improvement in either surface smoothness or mechanical properties are seen, and so there is little justification for the further increase in cost for extra materials.

The biaxially oriented sheets of the invention preferably have a water vapor permeability that is less than $0.85 \times 10^{-5}$ g/mm²/day. This allows faster emulsion hardening, as the laminated support of this invention does not transmit water vapor from the emulsion layers during coating of the emulsions on the support. The transmission rate is measured by ASTM F1249.

"Void" is used herein to mean devoid of added solid and liquid matter, although it is likely the "voids" contain gas. The void-initiating particles which remain in the finished packaging sheet core should be from 0.1 to 10 µm in diameter, preferably round in shape, to produce voids of the desired shape and size. The size of the void is also dependent on the degree of orientation in the machine and transverse directions. Ideally, the void would assume a shape which is defined by two opposed and edge contacting concave disks. In other words, the voids tend to have a lens-like or biconvex shape. The voids are oriented so that the two major dimensions are aligned with the machine and transverse directions of the sheet. The Z-direction axis is a minor dimension and is roughly the size of the cross diameter of the voiding particle. The voids generally tend to be closed cells, and thus there is virtually no path open from one side of the voided-core to the other side through which gas or liquid can traverse.

The void-initiating material may be selected from a variety of materials, and should be present in an amount of about 5–50% by weight based on the weight of the core matrix polymer. Preferably, the void-initiating material comprises a polymeric material. When a polymeric material is used, it may be a polymer that can be melt-mixed with the polymer from which the core matrix is made and be able to form dispersed spherical particles as the suspension is cooled down. Examples of this would include nylon dispersed in polypropylene, polybutylene terephthalate in polypropylene, or polypropylene dispersed in polyethylene terephthalate. If the polymer is preshaped and blended into the matrix polymer, the important characteristic is the size and shape of the particles. Spheres are preferred and they can be hollow or solid. These spheres may be made from cross-linked polymers which are members selected from the group consisting of an alkenyl aromatic compound having the general formula Ar—C(R)=CH$_2$, wherein Ar represents an aromatic hydrocarbon radical, or an aromatic halohydrocarbon radical of the benzene series and R is hydrogen or the methyl radical; acrylate-type monomers include monomers of the formula CH$_2$=C(R')—C(O)(OR) wherein R is selected from the group consisting of hydrogen and an alkyl radical containing from about 1 to 12 carbon atoms and R' is selected from the group consisting of hydrogen and methyl; copolymers of vinyl chloride and vinylidene chloride, acrylonitrile and vinyl chloride, vinyl bromide, vinyl esters having formula CH$_2$=CH(O)COR, wherein R is an alkyl radical containing from 2 to 18 carbon atoms; acrylic acid, methacrylic acid, itaconic acid, citraconic acid, maleic acid, fumaric acid, oleic acid, vinylbenzoic acid; the synthetic polyester resins which are prepared by reacting terephthalic acid and dialkyl terephthalics or ester-forming derivatives thereof, with a glycol of the series $HO(CH_2)_nOH$ wherein n is a whole number within the range of 2–10 and having reactive olefinic linkages within the polymer molecule, the above described polyesters which include copolymerized therein up to 20 percent by weight of a second acid or ester thereof having reactive olefinic unsaturation and mixtures thereof, and a cross-linking agent selected from the group consisting of divinylbenzene, diethylene glycol dimethacrylate, diallyl fumarate, diallyl phthalate and mixtures thereof.

Examples of typical monomers for making the crosslinked void initiating polymer include styrene, butyl acrylate, acrylamide, acrylonitrile, methyl methacrylate, ethylene glycol dimethacrylate, vinyl pyridine, vinyl acetate, methyl acrylate, vinylbenzyl chloride, vinylidene chloride, acrylic acid, divinylbenzene, acrylamidomethylpropane sulfonic acid, and vinyl toluen. Preferably, the cross-linked polymer is polystyrene or poly(methyl methacrylate). Most preferably, it is polystyrene and the cross-linking agent is divinylbenzene.

Processes well known in the art yield non-uniformly sized particles, characterized by broad particle size distributions. The resulting beads can be classified by screening the beads spanning the range of the original distribution of sizes. Other processes such as suspension polymerization, limited coalescence, directly yield very uniformly sized particles.

The void-initiating materials may be coated with agents to facilitate voiding. Suitable agents or lubricants include colloidal silica, colloidal alumina, and metal oxides such as tin oxide and aluminum oxide. The preferred agents are colloidal silica and alumina, most preferably, silica. The cross-linked polymer having a coating of an agent may be prepared by procedures well known in the art. For example, conventional suspension polymerization processes wherein the agent is added to the suspension is preferred. As the agent, colloidal silica is preferred.

The void-initiating particles can also be inorganic spheres, including solid or hollow glass spheres, metal or ceramic beads or inorganic particles such as clay, talc, barium sulfate, calcium carbonate. The important thing is that the material does not chemically react with the core matrix polymer to cause one or more of the following problems: (a) alteration of the crystallization kinetics of the matrix polymer, making it difficult to orient, (b) destruction of the core matrix polymer, (c) destruction of the void-initiating particles, (d) adhesion of the void-initiating particles to the matrix polymer, or (e) generation of undesirable reaction products, such as toxic or high color moieties. The void-initiating material should not be photographically active or degrade the performance of the photographic element in which the biaxially oriented polyolefin film is utilized.

For the biaxially oriented sheets on the topside toward the emulsion, suitable classes of thermoplastic polymers for the biaxially oriented sheet and the core matrix-polymer of the preferred composite sheet comprise polyolefins. Suitable polyolefins include polypropylene, polyethylene, polymethylpentene, polystyrene, polybutylene and mixtures thereof. Polyolefin copolymers, including copolymers of propylene, ethylene hexene, butene, and octene. Polypropylene is preferred, as it is low in cost and has desirable strength properties.

The non-voided skin layers of the composite sheet can be made of the same polymeric materials as listed above for the core matrix. The composite sheet can be made with skin(s) of the same polymeric material as the core matrix, or it can be made with skin(s) of different polymeric composition than the core matrix. In the case of a multiple layer system, when different polymeric materials are used, an additional layer may be required to promote adhesion between non-compatible polymeric materials so that the biaxially oriented sheets do not have layer fracture during manufacturing or in the final imaging element format.

The total thickness of the top most skin layer or exposed surface layer should be between 0.20 $\mu$m and 1.5 $\mu$m, preferably between 0.5 and 1.0 $\mu$m. Below 0.5 $\mu$m any inherent non-planarity in the co-extruded skin layer may result in unacceptable color variation. At skin thickness greater than 1.0 $\mu$m, there is a reduction in the photographic optical properties such as image resolution. At thickness greater that 1.0 $\mu$m there is also a greater material volume to filter for contamination such as clumps, poor color pigment dispersion, or contamination.

Addenda may be added to the top most skin layer to change the color of the imaging element. For photographic use, a white base with a slight bluish tinge is preferred. The addition of the slight bluish tinge may be accomplished by any process which is known in the art including the machine blending of color concentrate prior to extrusion and the melt extrusion of blue colorants that have been pre-blended at the desired blend ratio. Colored pigments that can resist extrusion temperatures greater than 320° C. are preferred as temperatures greater than 320° C. are necessary for co-extrusion of the skin layer. Blue colorants used in this invention may be any colorant that does not have an adverse impact on the imaging element. Preferred blue colorants include Phthalocyanine blue pigments, Cromophtal blue pigments, Irgazin blue pigments, Irgalite organic blue pigments and pigment Blue 60.

One preferred embodiment of this invention is a very thin coating (0.2 to 1.5 $\mu$m) on the surface immediately below the emulsion layer that can be made by coextrusion and subsequent stretching in the width and length direction. It has been found that this layer is, by nature, extremely accurate in thickness and can be used to provide all the color corrections which are usually distributed throughout the thickness of the sheet between the emulsion and the paper base. This topmost layer is so efficient that the total colorants needed to provide a correction are less than one-half the amount needed if the colorants are dispersed throughout thickness. Colorants are often the cause of spot defects due to clumps and poor dispersions. Spot defects, which decrease the commercial value of images, are improved with this invention because less colorant is used and high quality filtration to clean up the colored layer is much more feasible since the total volume of polymer with colorant is only typically 2 to 10 percent of the total polymer between the base paper and the photosensitive layer.

While the addition of $TiO_2$ in the thin skin layer of this invention does not significantly contribute to the optical performance of the sheet it can cause numerous manufacturing problems such as extrusion die lines and spots. The skin layer substantially free of $TiO_2$ is preferred. $TiO_2$ added to a layer between 0.20 and 1.5 $\mu$m thick does not substantially improve the optical properties of the support, will add cost to the design and will cause objectionable pigments lines in the extrusion process.

Addenda may be added to the biaxially oriented sheet of this invention so that when the biaxially oriented sheet is viewed from a surface, the imaging element emits light in the visible spectrum when exposed to ultraviolet radiation. Emission of light in the visible spectrum allows for the support to have a desired background color in the presence of ultraviolet energy. This is particularly useful when images are viewed outside as sunlight contains ultraviolet energy and may be used to optimize image quality for consumer and commercial applications.

Addenda known in the art to emit visible light in the blue spectrum are preferred. Consumers generally prefer a slight blue tint to white defined as a negative b* compared to a white white defined as a b* within one b* unit of zero, b* is the measure of yellow/blue in CIE space. A positive b* indicates yellow while a negative b* indicates blue. The addition of addenda that emits in the blue spectrum allows for tinting the support without the addition of colorants which would decrease the whiteness of the image. The preferred emission is between 1 and 5 delta b* units. Delta b* is defined as the b* difference measured when a sample is illuminated ultraviolet light source and a light source without any significant ultraviolet energy. Delta b* is the preferred measure to determine the net effect of adding an optical brightener to the top biaxially oriented sheet of this invention. Emissions less than 1 b* unit can not be noticed by most customers therefore is it not cost effective to add this small amount of optical brightner to the biaxially oriented sheet. An emission greater that 5 b* units would interfere with the color balance of the prints making the whites appear too blue for most consumers.

The preferred addenda of this invention is an optical brightener. An optical brightener is colorless, fluorescent, organic compound that absorbs ultraviolet light and emits it as visible blue light. Examples include but are not limited to derivatives of 4,4'-diaminostilbene-2,2'-disulfonic acid, coumarin derivatives such as 4-methyl-7-diethylaminocoumarin, 1-4-Bis (O-Cyanostyryl) Benzol and 2-Amino-4-Methyl Phenol.

Layers below the exposed surface layer in biaxially oriented sheets of the invention may also contain pigments which are known to improve the photographic optical responses such as whiteness or sharpness. Titanium dioxide is used in this invention to improve image sharpness, whiteness and provide the required level of opacity to the biaxially oriented sheets. The $TiO_2$ used may be either anatase or rutile type. For this invention, rutile is the preferred because the unique particle size and geometry optimize image quality for most consumer applications. Examples of rutile $TiO_2$ that are acceptable for a photographic system are DuPont Chemical Co. R101 rutile $TiO_2$ and DuPont Chemical Co. R104 rutile TiO2. Other pigments to improve image quality may also be used in this invention.

Traditional photographic supports that contain optical brightener generally use anatase $TiO_2$ in combination optical brightener. The use of rutile $TiO_2$, while preferred for image quality, tends to reduce the efficiency of the optical brightener when optical brightener and rutile $TiO_2$ are used in combination. Prior art photographic supports containing optical brightener generally use anatase $TiO_2$ in combination with optical brightener. By concentrating the optical brightener and rutile $TiO_2$ in one functional thin layer, rutile $TiO_2$ does not significantly reduce the efficiency of the optical brightener allowing for rutile $TiO_2$ and optical brightener to be used together which improves image quality. The preferred location for the $TiO_2$ is adjacent to the exposed layer. This location allows for efficient manufacture of the biaxially oriented coextruded structure as the $TiO_2$ does not come in contact with exposed extrusion die surfaces.

The optical brightener may be added to any layer in the multilayer coextruded biaxially oriented polyolefin sheet. The preferred location is adjacent to or in the exposed surface layer of said sheet. This allows for the efficient concentration of optical brightener which results in less optical brightener being used when compared to traditional photographic supports. Typically 20% to 40% less optical brightener is required when the optical brightener is concentrated in a functional layer close to the imaging layers.

When the desired weight percent loading of the optical brightener begins to approach a concentration at which the optical brightener migrates to the surface of the support forming crystals in the imaging layer, the addition of optical brightener into the layer adjacent to the exposed layer is preferred. In prior art imaging supports that use optical brightener, expensive grades of optical brightener are used to prevent migration into the imaging layer. Optical brightener migration is a concern as migration of the optical brightener will form undesirable crystals in the bottom imaging layer. In light sensitive silver halide imaging systems, the preferred layer adjacent to the gelatin layer comprises polyethylene that is substantially free of optical brightener. The migration of the optical brightener from the layer adjacent to the polyethylene layer is significantly reduced because the polyethylene surface layer acts as a barrier for optical brightener migration allowing for much higher optical brightener levels to be used to optimize image quality. Further, locating the optical brightener in the layer adjacent to the polyethylene layer allows for a less expensive optical brightener to be used as the polyethylene layer, which is substantially free of optical brightener, prevents significant migration of the optical brightener.

It is preferred to reduce unwanted optical brightener migration in biaxially oriented sheets of this invention by the use of polypropylene for the layer adjacent to the polyethylene surface. Prior art photographic supports generally use melt extruded polyethylene to provide waterproofing to the base paper. Since optical brightener is more soluble in polypropylene than polyethylene, the optical brightener is less likely to migrate from polypropylene to the exposed surface layer.

A biaxially oriented sheet of this invention which has a microvoided core is preferred. The microvoided core adds opacity and whiteness to the imaging support further improving imaging quality. Combining the image quality advantages of a microvoided core with a material which absorbs ultraviolet energy and emits light in the visible spectrum allows for the unique optimization of image quality as the image support can have a tint when exposed to ultraviolet energy yet retain excellent whiteness when the image is viewed using lighting that does not contain significant amounts of ultraviolet energy such as indoor lighting.

Addenda may be also added to the core matrix to further improve the whiteness of these sheets. This would include any process which is known in the art including adding a white pigment, such as titanium dioxide, barium sulfate, clay, or calcium carbonate. This would also include adding fluorescing agents which absorb energy in the ultraviolet region and emit light largely in the blue region, or other additives which would improve the physical properties of the sheet or the manufacturability of the sheet.

The coextrusion, quenching, orienting, and heat setting of these composite sheets may be effected by any process which is known in the art for producing oriented sheet, such as by a flat sheet process or a bubble or tubular process. The flat sheet process involves extruding the blend through a slit die and rapidly quenching the extruded web upon a chilled casting drum so that the core matrix polymer component of the sheet and the skin components(s) are quenched below their glass solidification temperature. The quenched sheet is then biaxially oriented by stretching in mutually perpendicular directions at a temperature above the glass transition temperature, below the melting temperature of the matrix polymers. The sheet may be stretched in one direction and then in a second direction or may be simultaneously stretched in both directions. A stretching ratio, defined as the final length divided by the original length for sum of the machine and cross directions, of at least 10 to 1 is preferred. After the sheet has been stretched, it is heat set by heating to a temperature sufficient to crystallize or anneal the polymers while restraining to some degree the sheet against retraction in both directions of stretching.

The composite sheet, while described as having preferably at least three layers of a core and a skin layer on each side, may also be provided with additional layers that may serve to change the properties of the biaxially oriented sheet. Biaxially oriented sheets could be formed with surface layers that would provide an improved adhesion, or look to the support and photographic element. The biaxially oriented extrusion could be carried out with as many as 10 layers if desired to achieve some particular desired property.

These composite sheets may be coated or treated after the coextrusion and orienting process or between casting and full orientation with any number of coatings which may be used to improve the properties of the sheets including printability, to provide a vapor barrier, to make them heat sealable, or to improve the adhesion to the support or to the photo sensitive layers. Examples of this would be acrylic coatings for printability and coating polyvinylidene chloride for heat seal properties. Further examples include flame, plasma or corona discharge treatment to improve printability or adhesion.

By having at least one non-voided skin on the microvoided core, the tensile strength of the sheet is increased and makes it more manufacturable. It allows the sheets to be made at wider widths and higher draw ratios than when sheets are made with all layers voided. Coextruding the layers further simplifies the manufacturing process.

The structure of a preferred biaxially oriented top sheet of the invention where the exposed surface is coated with the imaging layers is as follows:

---
Polyethylene surface layer containing blue pigments
Polypropylene with optical brightener and 18% rutile $TiO_2$
Polypropylene microvoided layer with a density of 0.65 g/cm$^3$
Polypropylene with 18% anatase $TiO_2$
Polyethylene

---

The bottom sheet on the side of the base paper opposite to the emulsion layers may be any suitable sheet. The bottom sheet may or may not be microvoided. It may have the same composition as the sheet on the topside of the paper backing material. Biaxially oriented sheets are conveniently manufactured by coextrusion of the bottom sheet, which may contain several layers, followed by biaxial orientation. Such biaxially oriented sheets are disclosed in, for example, U.S. Pat. No. 4,764,425.

The preferred biaxially oriented bottom sheet is a biaxially oriented polyolefin sheet, most preferably a sheet of polyethylene or polypropylene. The thickness of the biaxially oriented bottom sheet should be from 10 to 150 μm. Below 15 μm, the sheets may not be thick enough to minimize any inherent non-planarity in the support and would be more difficult to manufacture. At thickness higher than 70 μm, little improvement in either surface smoothness or mechanical properties are seen, and so there is little justification for the further increase in cost for extra materials.

Suitable classes of thermoplastic polymers for the biaxially oriented bottom sheet include polyolefins, polyesters, polyamides, polycarbonates, cellulosic esters, polystyrene, polyvinyl resins, polysulfonamides, polyethers, polyimides, polyvinylidene fluoride, polyurethanes, polyphenylenesulfides, polytetrafluoroethylene, polyacetals, polysulfonates, polyester ionomers, and polyolefin ionomers. Copolymers and/or mixtures of these polymers can be used.

Suitable polyolefins include polypropylene, polyethylene, polymethylpentene, and mixtures thereof. Polyolefin copolymers, including copolymers of propylene and ethylene such as hexene, butene and octene are also useful. Polypropylenes are preferred because they are low in cost and have good strength and surface properties.

Suitable polyesters include those produced from aromatic, aliphatic or cycloaliphatic dicarboxylic acids of 4–20 carbon atoms and aliphatic or alicyclic glycols having from 2–24 carbon atoms. Examples of suitable dicarboxylic acids include terephthalic, isophthalic, phthalic, naphthalene dicarboxylic acid, succinic, glutaric, adipic, azelaic, sebacic, fumaric, maleic, itaconic, 1,4-cyclohexanedicarboxylic, sodiosulfoisophthalic and mixtures thereof. Examples of suitable glycols include ethylene glycol, propylene glycol, butanediol, pentanediol, hexanediol, 1,4-cyclohexanedimethanol, diethylene glycol, other polyethylene glycols and mixtures thereof. Such polyesters are well known in the art and may be produced by well known techniques, e.g., those described in U.S. Pat. Nos. 2,465,319 and 2,901,466. Preferred continuous matrix polyesters are those having repeat units from terephthalic acid or naphthalene dicarboxylic acid and at least one glycol selected from ethylene glycol, 1,4-butanediol and 1,4-cyclohexanedimethanol. Poly(ethylene terephthalate), which may be modified by small amounts of other monomers, is especially preferred. Other suitable polyesters include liquid crystal copolyesters formed by the inclusion of suitable amount of a co-acid component such as stilbene dicarboxylic acid. Examples of such liquid crystal copolyesters are those disclosed in U.S. Pat. Nos. 4,420,607, 4,459,402 and 4,468,510.

Useful polyamides include nylon 6, nylon 66, and mixtures thereof. Copolymers of polyamides are also suitable continuous phase polymers. An example of a useful polycarbonate is bisphenol-A polycarbonate. Cellulosic esters suitable for use as the continuous phase polymer of the composite sheets include cellulose nitrate, cellulose triacetate, cellulose diacetate, cellulose acetate propionate, cellulose acetate butyrate, and mixtures or copolymers thereof. Useful polyvinyl resins include polyvinyl chloride, poly(vinyl acetal), and mixtures thereof. Copolymers of vinyl resins can also be utilized.

The biaxially oriented sheet on the backside of the laminated base can be made with layers of the same polymeric material, or it can be made with layers of different polymeric composition. For compatibility, an auxiliary layer can be used to promote adhesion of multiple layers.

Addenda may be added to the biaxially oriented backside sheet to improve the whiteness of these sheets. This would include any process which is known in the art including adding a white pigment, such as titanium dioxide, barium sulfate, clay, or calcium carbonate. The addition of fluorescing agents which absorb energy in the ultraviolet region and emit light largely in the blue region is preferred. The addition of materials which absorb energy in the ultraviolet region and emit light in the blue region to the backside sheet mask the yellowing of the paper as the paper ages with time and temperature. The preferred location for the optical brightener for bottom sheet of this invention is adjacent to the exposed skin layer. This allows for the skin layer to act as a barrier for optical brightener migration.

The coextrusion, quenching, orienting, and heat setting of these biaxially oriented sheets may be effected by any process which is known in the art for producing oriented sheet, such as by a flat sheet process or a bubble or tubular process. The flat sheet process involves extruding or coextruding the blend through a slit die and rapidly quenching the extruded or coextruded web upon a chilled casting drum so that the polymer component(s) of the sheet are quenched below their solidification temperature. The quenched sheet is then biaxially oriented by stretching in mutually perpendicular directions at a temperature above the glass transition temperature of the polymer(s). The sheet may be stretched in one direction and then in a second direction or may be simultaneously stretched in both directions. After the sheet has been stretched, it is heat set by heating to a temperature sufficient to crystallize the polymers while restraining to some degree the sheet against retraction in both directions of stretching.

The biaxially oriented sheet on the back side of the laminated base, while described as having preferably at least one layer, may also be provided with additional layers that may serve to change the properties of the biaxially oriented sheet. A different effect may be achieved by additional layers. Such layers might contain tints, antistatic materials, or slip agents to produce sheets of unique properties. Biaxially oriented sheets could be formed with surface layers that would provide an improved adhesion, or look to the support and photographic element. The biaxially oriented extrusion could be carried out with as many as 10 layers if desired to achieve some particular desired property.

These biaxially oriented sheets may be coated or treated after the coextrusion and orienting process or between casting and full orientation with any number of coatings which may be used to improve the properties of the sheets including printability, to provide a vapor barrier, to make them heat sealable, or to improve the adhesion to the support or to the photo sensitive layers. Examples of this would be acrylic coatings for printability and a coating of polyvinylidene chloride to improve heat seal properties. Further examples include flame, plasma or corona discharge treatment to improve printability or adhesion.

The structure of a preferred biaxially oriented bottom sheet of the invention where the solid core layer is bonded to the support base is as follows:

| |
|---|
| Polyethylene and a terpolymer of ethylene propylene and butylene (skin layer) |
| Polypropylene (solid core layer) |

The support to which the microvoided composite sheets and biaxially oriented sheets are laminated for the laminated support of the photosensitive silver halide layer may be a polymeric, a synthetic paper, cloth, woven polymer fibers, or a cellulose fiber paper support, or laminates thereof. The base also may be a microvoided polyethylene terephalate such as disclosed in U.S. Pat. Nos. 4,912,333; 4,994,312 and 5,055,371.

The preferred support is a photographic grade cellulose fiber paper because cellulose paper is low in cost compared to polymer bases and the physical properties of the paper are within the design specification of photographic processing equipment. Traditional photographic grade paper contains optical brightener to provide a slight blue tint to the paper when viewed from the backside. This slight blue tint masks the undesirable yellowing of the paper over time. When optical brightener is added to the top and bottom biaxially oriented polymer sheets, a cellulose base paper substantially free of optical brightener is preferred as the optical brightener can be concentrated and thus more effective in the biaxially oriented sheet laminated to the base paper.

When using a cellulose fiber paper support, it is preferable to extrusion laminate the microvoided composite sheets to the base paper using a polyolefin resin. Extrusion laminating is carried out by bringing together the biaxially oriented sheets of the invention and the base paper with application of an adhesive between them followed by their being pressed in a nip such as between two rollers. The adhesive may be applied to either the biaxially oriented sheets or the base paper prior to their being brought into the nip. In a preferred form the adhesive is applied into the nip simultaneously with the biaxially oriented sheets and the base paper. The adhesive may be any suitable material that does not have a harmful effect upon the photographic element. A preferred material is polyethylene that is melted at the time it is placed into the nip between the paper and the biaxially oriented sheet.

The curl of the imaging element can be controlled by the controlled heating and subsequent cooling of the biaxially oriented sheets of this invention. Because the biaxially oriented sheets of this invention are high in strength compared to prior art cast polyethylene layers, if they are heated prior to lamination they will expand. Upon subsequent cooling, the biaxially oriented sheet will stress the imaging element balancing the humidity sensitive gelatin imaging layers.

FIG. 1 shows a preferred film lamination system that has both tension and temperature adjustment for the film to control curl in a photographic element. The supply of high strength biaxially oriented polymer sheet to be laminated is unwound from a wide roll 10. Tension control is applied by tension sensing and control device 12 and feedback to the unwind motor (not shown of roll 10). Tempered fluid is supplied to the rollers 16, 18 and 26. These rollers are designed to provide adequate temperature control of the biaxially oriented sheet at the point where the melt extruded adhesive is applied from a slit die 20. The rollers 16 and 18 could be replaced by any other method that can control film temperature such as forced air or infrared heating. If the design for heat transfer is sufficient, the entire temperature control may be done by roller 26 without the use of rollers 16 and 18. The temperature controlled biaxially oriented sheet 14 is laminated to base 22. Roller 24 applies pressure to evenly join the biaxially oriented sheet 14, the adhesive from slit die 20, and base material 22. The adhesive is solidified during the contact time on roller 26 and the laminated base 28 exits the lamination process.

The preferred method for heating the biaxially oriented sheet prior to lamination is by a heated roller. A heated roller allows for efficient heat transfer of a moving web in a continuous process. The preferred method for the cooling of the web after lamination is a cooling roll. A cooling roll allows for efficient cooling of the web in a continuous process.

The preferred temperature for the heating of the bottom sheet is between the ambient temperature and below the glass transition temperature. Temperatures below the ambient temperature of the bottom would shrink the sheets prior to lamination causing creasing and buckling when the laminated support returned to ambient temperature. The preferred temperature for the top sheet is at or below the ambient temperature. The thicker top sheet at ambient temperature may balance a thinner bottom sheet that has been heated prior to the lamination. At temperatures below ambient, the top sheet shrinks and works synergistically with the bottom sheet. At temperatures above the glass transition temperature, the polymer would flow and become stress relieved. Heating the polymer sheet to the glass transition temperature of the base polymer would eliminate the thermal induced stress for curl control. For polyolefin sheets of this invention such as polyolefin sheets, heating the sheet between 32 and 100° C. is preferred. For polyolefins, temperatures less than 30° C. does not allow for sufficient thermal expansion. At temperatures greater than 120° C., the polyolefins begin to approach the glass transition temperature.

Figure 2:
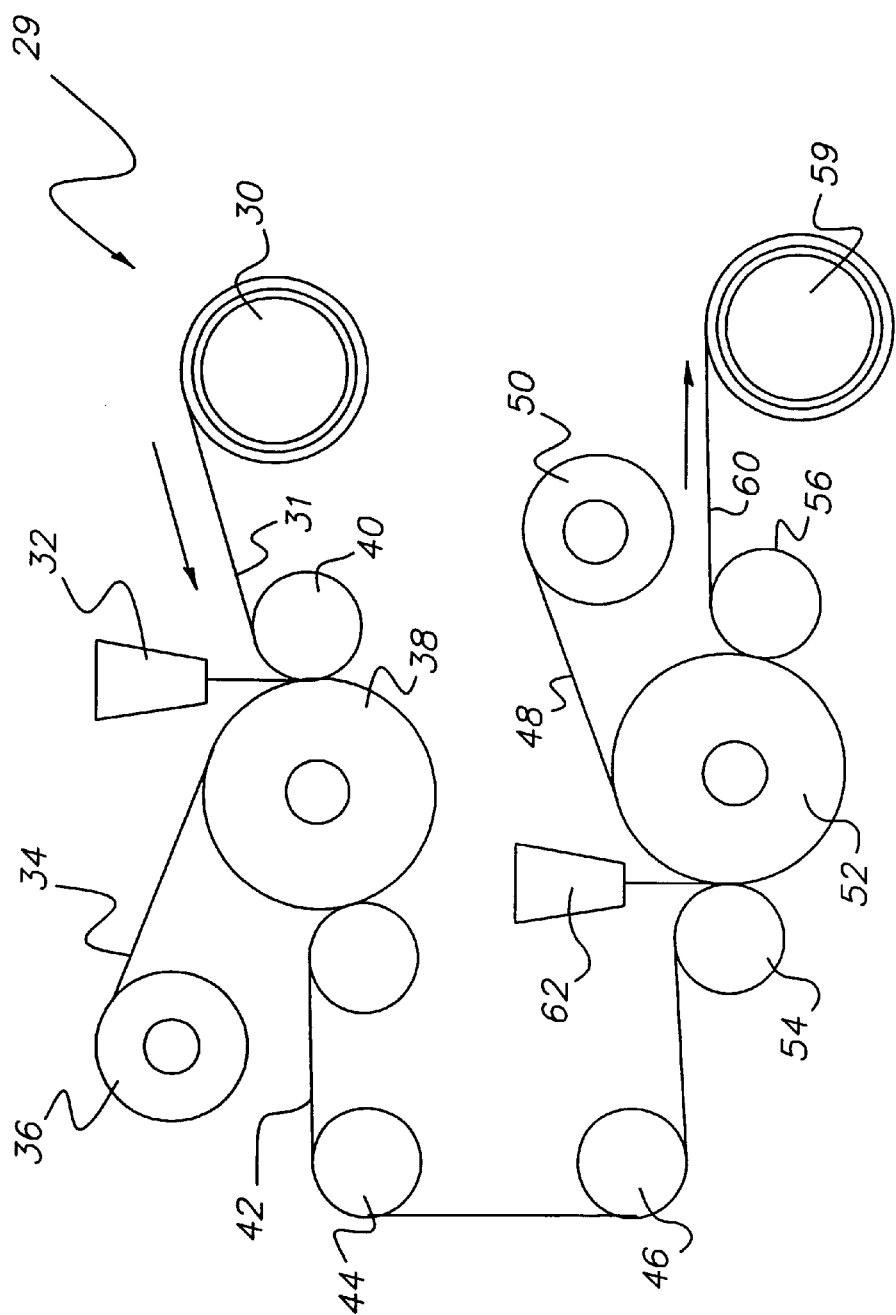
FIG. 2 is an illustration of a process to increase the curl control effects of temperature by heating and cooling on opposite sides of a core material.

FIG. 2 is an illustration of a preferred process and apparatus 29 to increase the curl control effects of temperature by heating and cooling on opposite sides of a base material. A core material 31 is supplied from wide roll 30. Biaxially oriented sheet 34 exits a cooling roll 36. Base materials 31 and biaxially oriented sheet 34 are laminated with a melt extruded adhesive from slit die 32. The web is transported through a pressure nip created from pressure roll 40 and chilled roll 38. The one side laminated support 42 exits the first lamination process and is transported to the second lamination process with conveyance rolls 44 and 46. The one side laminated web 42 then enters the second lamination process and biaxially oriented sheet 48, that has been heated by roll 50 is laminated to web 42 in a pressure nip created by pressure roll 54 and chilled roll 52 by a melt extruded adhesive from slit die 62. The laminated imaging support 60 is stripped from roll 52 by stripping roll 56 and exits the lamination process. The laminated support is wound on roller 59. In this lamination process the imaging support curls toward the heated side because the cool sheet expands and the heated sheet contracts at room temperature.

As used herein, the phrase "imaging element" is a material that utilizes nonphotographic or nonsilver halide technology in the formation of images. Non-photographic imaging methods include thermal dye transfer, ink jet, electrophotographic, electrographic, flexographic printing or rotogravure printing.

The thermal dye image-receiving layer on the top of the receiving elements of the invention may comprise, for example, a polycarbonate, a polyurethane, a polyester, polyvinyl chloride, poly(styrene-co-acrylonitrile), poly (caprolactone), or mixtures thereof. The dye image-receiving layer may be present in any amount which is effective for the intended purpose. In general, good results have been obtained at a concentration of from about 1 to about 10 g/m². An overcoat layer may be further coated over the dye-receiving layer, such as described in U.S. Pat. No. 4,775,657 of Harrison et al.

Dye-donor elements that are used with the dye-receiving element of the invention conventionally comprise a support having thereon a dye containing layer. Any dye can be used in the dye-donor employed in the invention provided it is transferable to the dye-receiving layer by the action of heat. Especially good results have been obtained with sublimable dyes. Dye donors applicable for use in the present invention are described, e.g., in U.S. Pat. Nos. 4,916,112; 4,927,803; and 5,023,228.

As noted above, dye-donor elements are used to form a dye transfer image. Such a process comprises image-wise-heating a dye-donor element and transferring a dye image to a dye-receiving element as described above to form the dye transfer image.

In a preferred embodiment of the thermal dye transfer method of printing, a dye donor element is employed which compromises a poly-(ethylene terephthalate) support coated with sequential repeating areas of cyan, magenta, and yellow dye, and the dye transfer steps are sequentially performed for each color to obtain a three-color dye transfer image. Of course, when the process is only performed for a single color, then a monochrome dye transfer image is obtained.

Thermal printing heads which can be used to transfer dye from dye-donor elements to receiving elements of the invention are available commercially. There can be employed, for example, a Fujitsu Thermal Head (FTP-040 MCS001), a TDK Thermal Head F415 HH7-1089, or a Rohm Thermal Head KE 2008-F3. Alternatively, other known sources of energy for thermal dye transfer may be used, such as lasers as described in, for example, GB 2,083,726A.

A thermal dye transfer assemblage of the invention comprises (a) a dye-donor element, and (b) a dye-receiving element as described above, the dye-receiving element being in a superposed relationship with the dye-donor element so that the dye layer of the donor element is in contact with the dye image-receiving layer of the receiving element.

When a three-color image is to be obtained, the above assemblage is formed on three occasions during the time when heat is applied by the thermal printing head. After the first dye is transferred, the elements are peeled apart. A second dye-donor element (or another area of the donor element with a different dye area) is then brought in register with the dye-receiving element, and the process repeated. The third color is obtained in the same manner.

The electrographic and electrophotographic processes and their individual steps have been well described in detail in many books and publications. The processes incorporate the basic steps of creating an electrostatic image, developing that image with charged, colored particles (toner), optionally transferring the resulting developed image to a secondary substrate, and fixing the image to the substrate. There are numerous variations in these processes and basic steps; the use of liquid toners in place of dry toners is simply one of those variations.

The first basic step, creation of an electrostatic image, can be accomplished by a variety of methods. The electrophotographic process of copiers uses imagewise photodischarge, through analog or digital exposure, of a uniformly charged photoconductor. The photoconductor may be a single-use system, or it may be rechargeable and reimageable, like those based on selenium or organic photoreceptors.

In one form of the electrophotographic process of copiers uses imagewise photodischarge, through analog or digital exposure, of a uniformly charged photoconductor. The photoconductor may be a single-use system, or it may be rechargeable and reimageable, like those based on selenium or organic photoreceptors.

In one form of the electrophotographic process, a photosensitive element is permanently imaged to form areas of differential conductivity. Uniform electrostatic charging, followed by differential discharge of the imaged element, creates an electrostatic image. These elements are called electrographic or xeroprinting masters because they can be repeatedly charged and developed after a single imaging exposure.

In an alternate electrographic process, electrostatic images are created ionographically. The latent image is created on dielectric (charge-holding) medium, either paper or film. Voltage is applied to selected metal styli or writing nibs from an array of styli spaced across the width of the medium, causing a dielectric breakdown of the air between the selected styli and the medium. Ions are created, which form the latent image on the medium.

Electrostatic images, however generated, are developed with oppositely charged toner particles. For development with liquid toners, the liquid developer is brought into direct contact with the electrostatic image. Usually a flowing liquid is employed, to ensure that sufficient toner particles are available for development. The field created by the electrostatic image causes the charged particles, suspended in a nonconductive liquid, to move by electrophoresis. The charge of the latent electrostatic image is thus neutralized by the oppositely charged particles.

If a reimageable photoreceptor or an electrographic master is used, the toned image is transferred to paper (or other substrate). The paper is charged electrostatically, the polarity chosen to cause the toner particles to transfer to the paper. Finally, the toned image is fixed to the paper. For self-fixing toners, residual liquid is removed from the paper by air-drying or heating. Upon evaporation of the solvent, these toners form a film bonded to the paper. For heat-fusible toners, thermoplastic polymers are used as part of the particle. Heating both removes residual liquid and fixes the toner to paper.

The dye receiving layer or DRL for ink jet imaging may be applied by any known methods, such as solvent coating, or melt extrusion coating techniques. The DRL is coated over the tie layer or TL at a thickness ranging from 0.1–10 $\mu$m, preferably 0.5–5 $\mu$m. There are many known formulations which may be useful as dye receiving layers. The primary requirement is that the DRL is compatible with the inks which it will be imaged so as to yield the desirable color gamut and density. As the ink drops pass through the DRL, the dyes are retained or mordanted in the DRL, while the ink solvents pass freely through the DRL and are rapidly absorbed by the TL. Additionally, the DRL formulation is preferably coated from water, exhibits adequate adhesion to the TL, and allows for easy control of the surface gloss.

For example, Misuda et al. in U.S. Pat. Nos. 4,879,166; 5,264,275; 5,104,730; 4,879,166; and Japanese patents 1,095,091; 2,276,671; 2,276,670; 4,267,180; 5,024,335; 5,016,517 discloses aqueous based DRL formulations comprising mixtures of psuedo-bohemite and certain water soluble resins. Light, in U.S. Pat. Nos. 4,903,040; 4,930,041; 5,084,338; 5,126,194; 5,126,195; and 5,147,717, discloses aqueous-based DRL formulations comprising mixtures of vinyl pyrrolidone polymers and certain water-dispersible and/or water-soluble polyesters, along with other polymers and addenda. Butters et al. in U.S. Pat. Nos. 4,857,386 and 5,102,717 disclose ink-absorbent resin layers comprising mixtures of vinyl pyrrolidone polymers and acrylic or methacrylic polymers. Sato et al. in U.S. Pat. No. 5,194,317 and Higuma et al. in U.S. Pat. No. 5,059,983 disclose aqueous-coatable DRL formulations based on poly (vinyl alcohol). Iqbal, in U.S. Pat. No. 5,208,092 discloses water-based ink receiver layer or IRL formulations comprising vinyl copolymers which are subsequently cross-linked. In addition to these examples, there may be other known or contemplated DRL formulations which are consistent with the aforementioned primary and secondary requirements of the DRL, all of which fall under the spirit and scope of the current invention.

The preferred DRL is a 0.1–10 $\mu$m DRL which is coated as an aqueous dispersion of 5 parts alumoxane and 5 parts poly (vinyl pyrrolidone). The DRL may also contain varying levels and sizes of matting agents for the purpose of controlling gloss, friction, and/or fingerprint resistance, surfactants to enhance surface uniformity and to adjust the surface tension of the dried coating, mordanting agents, antioxidants, UV absorbing compounds, light stabilizers, and the like.

Although the ink-receiving elements as described above can be successfully used to achieve the objectives of the present invention, it may be desirable to overcoat the DRL for the purpose of enhancing the durability of the imaged element. Such overcoats may be applied to the DRL either before or after the element is imaged. For example, the DRL can be overcoated with an ink-permeable layer through which inks freely pass. Layers of this type are described in U.S. Pat. Nos. 4,686,118; 5,027,131; and 5,102,717, in European Patent Specification 0 524 626. Alternatively, an overcoat may be added after the element is imaged. Any of the known laminating films and equipment may be used for this purpose. The inks used in the aforementioned imaging process are well known, and the ink formulations are often closely tied to the specific processes, i.e., continuous, piezoelectric, or thermal. Therefore, depending on the specific ink process, the inks may contain widely differing amounts and combinations of solvents, colorants, preservatives, surfactants, humectants, and the like. Inks preferred for use in combination with the image recording elements of the present invention are water-based, such as those currently sold for use in the Hewlett-Packard Desk Writer 560C printer. However, it is intended that alternative embodiments of the image-recording elements as described above, which may be formulated for use with inks which are specific to a given ink-recording process or to a given commercial vendor, fall within the scope of the present invention.

Printing generally accomplished by Flexographic or Rotogravure. Flexography is an offset letterpress technique where the printing plates are made from rubber or photopolymers. The printing is accomplished by the transfer of the ink from the raised surface of the printing plate to the support of this invention. The Rotogravure method of printing uses a print cylinder with thousands of tiny cells which are below the surface of the printing cylinder. The ink is transferred from the cells when the print cylinder is brought into contact with the web at the impression roll.

Suitable inks for this invention include solvent based inks, water based inks, and radiation cured inks. Examples of solvent based inks include nitrocellulose maleic, nitrocellulose polyamide, nitrocellulose acrylic, nitrocellulose urethane, chlorinated rubber, vinyl, acrylic, alcohol soluble acrylic, cellulose acetate acrylic styrene, and other synthetic polymers. Examples of water based inks include acrylic emulsion, maleic resin dispersion, styrene maleic anhydride resins, and other synthetic polymers. Examples of radiation cured inks include ultraviolet and electron beam cure inks.

When the support of this invention is printed with Flexographic or Rotogravure inks a ink adhesion coating may be required to allow for efficient printing of the support. The top layer of the biaxially oriented sheet may be coated with any materials known in the art to improve ink adhesion to biaxially oriented polyolefin sheets of this invention. Examples include acrylic coatings and polyvinyl alcohol coatings. Surface treatments to the biaxially oriented sheets of this invention may also be used to improve ink adhesion. Examples include corona and flame treatment.

As used herein, the phrase "photographic element" is a material that utilizes photosensitive silver halide in the formation of images. The photographic elements can be black and white, single color elements or multicolor elements. Multicolor elements contain image dye-forming units sensitive to each of the three primary regions of the spectrum. Each unit can comprise a single emulsion layer or multiple emulsion layers sensitive to a given region of the spectrum. The layers of the element, including the layers of the image-forming units, can be arranged in various orders as known in the art. In an alternative format, the emulsions sensitive to each of the three primary regions of the spectrum can be disposed as a single segmented layer.

The photographic emulsions useful for this invention are generally prepared by precipitating silver halide crystals in a colloidal matrix by methods conventional in the art. The colloid is typically a hydrophilic film forming agent such as gelatin, alginic acid, or derivatives thereof.

The crystals formed in the precipitation step are washed and then chemically and spectrally sensitized by adding spectral sensitizing dyes and chemical sensitizers, and by providing a heating step during which the emulsion temperature is raised, typically from 40° C. to 70° C., and maintained for a period of time. The precipitation and spectral and chemical sensitization methods utilized in preparing the emulsions employed in the invention can be those methods known in the art.

Chemical sensitization of the emulsion typically employs sensitizers such as: sulfur-containing compounds, e.g., allyl isothiocyanate, sodium thiosulfate and allyl thiourea; reducing agents, e.g., polyamines and stannous salts; noble metal compounds, e.g., gold, platinum; and polymeric agents, e.g., polyalkylene oxides. As described, heat treatment is employed to complete chemical sensitization. Spectral sensitization is effected with a combination of dyes, which are designed for the wavelength range of interest within the visible or infrared spectrum. It is known to add such dyes both before and after heat treatment.

After spectral sensitization, the emulsion is coated on a support. Various coating techniques include dip coating, air knife coating, curtain coating and extrusion coating.

The silver halide emulsions utilized in this invention may be comprised of any halide distribution. Thus, they may be comprised of silver chloride, silver bromide, silver bromochloride, silver chlorobromide, silver iodochloride, silver iodobromide, silver bromoiodochloride, silver chloroiodobromide, silver iodobromochloride, and silver iodochlorobromide emulsions. It is preferred, however, that the emulsions be predominantly silver chloride emulsions. By predominantly silver chloride, it is meant that the grains of the emulsion are greater than about 50 mole percent silver chloride. Preferably, they are greater than about 90 mole percent silver chloride; and optimally greater than about 95 mole percent silver chloride.

The silver halide emulsions can contain grains of any size and morphology. Thus, the grains may take the form of cubes, octahedrons, cubo-octahedrons, or any of the other naturally occurring morphologies of cubic lattice type silver halide grains. Further, the grains may be irregular such as spherical grains or tabular grains. Grains having a tabular or cubic morphology are preferred.

The photographic elements of the invention may utilize emulsions as described in The Theory of the Photographic Process, Fourth Edition, T. H. James, Macmillan Publishing Company, Inc., 1977, pages 151–152. Reduction sensitization has been known to improve the photographic sensitivity of silver halide emulsions. While reduction sensitized silver halide emulsions generally exhibit good photographic speed, they often suffer from undesirable fog and poor storage stability.

Reduction sensitization can be performed intentionally by adding reduction sensitizers, chemicals which reduce silver ions to form metallic silver atoms, or by providing a reducing environment such as high pH (excess hydroxide ion) and/or low pAg (excess silver ion). During precipitation of a silver halide emulsion, unintentional reduction sensitization can occur when, for example, silver nitrate or alkali solutions are added rapidly or with poor mixing to form emulsion grains. Also, precipitation of silver halide emulsions in the presence of ripeners (grain growth modifiers) such as thioethers, selenoethers, thioureas, or ammonia tends to facilitate reduction sensitization.

Examples of reduction sensitizers and environments which may be used during precipitation or spectral/chemical sensitization to reduction sensitize an emulsion include ascorbic acid derivatives; tin compounds; polyamine compounds; and thiourea dioxide-based compounds described in U.S. Pat. Nos. 2,487,850; 2,512,925; and British Patent 789,823. Specific examples of reduction sensitizers or conditions, such as dimethylamineborane, stannous chloride, hydrazine, high pH (pH 8–11) and low pAg (pAg 1–7) ripening are discussed by S. Collier in Photographic Science and Engineering, 23, 113 (1979). Examples of processes for preparing intentionally reduction sensitized silver halide emulsions are described in EP 0 348 934 A1 (Yamashita), EP 0 369 491 (Yamashita), EP 0 371 388 (Ohashi), EP 0 396 424 A1 (Takada), EP 0 404 142 A1 (Yamada), and EP 0 435 355 A1 (Makino).

The photographic elements of this invention may use emulsions doped with Group VIII metals such as iridium, rhodium, osmium, and iron as described in *Research Disclosure*, September 1994, Item 36544, Section I, published by Kenneth Mason Publications, Ltd., Dudley Annex, 12a North Street, Emsworth, Hampshire PO 10 7DQ, ENGLAND. Additionally, a general summary of the use of iridium in the sensitization of silver halide emulsions is contained in Carroll, "Iridium Sensitization: A Literature Review," Photographic Science and Engineering, Vol. 24, No. 6, 1980. A method of manufacturing a silver halide emulsion by chemically sensitizing the emulsion in the presence of an iridium salt and a photographic spectral sensitizing dye is described in U.S. Pat. 4,693,965. In some cases, when such dopants are incorporated, emulsions show an increased fresh fog and a lower contrast sensitometric curve when processed in the color reversal E-6 process as described in The British Journal of Photography Annual, 1982, pages 201–203.

A typical multicolor photographic element of the invention comprises the invention laminated support bearing a cyan dye image-forming unit comprising at least one red-sensitive silver halide emulsion layer having associated therewith at least one cyan dye-forming coupler; a magenta image-forming unit comprising at least one green-sensitive silver halide emulsion layer having associated therewith at least one magenta dye-forming coupler; and a yellow dye image-forming unit comprising at least one blue-sensitive silver halide emulsion layer having associated therewith at least one yellow dye-forming coupler. The element may contain additional layers, such as filter layers, interlayers, overcoat layers, subbing layers, and the like. The support of the invention may also be utilized for black and white photographic print elements.

The photographic elements may also contain a transparent magnetic recording layer such as a layer containing magnetic particles on the underside of a transparent support, as in U.S. Pat. Nos. 4,279,945 and 4,302,523. Typically, the element will have a total thickness (excluding the support) of from about 5 to about 30 $\mu$m.

The invention may be utilized with the materials disclosed in Research Disclosure, 40145 of September 1997. The invention is particularly suitable for use with the materials of the color paper examples of sections XVI and XVII. The couplers of section II are also particularly suitable. The Magenta I couplers of section II, particularly M-7, M-10, M-11 and M-18 set forth below are particularly desirable.

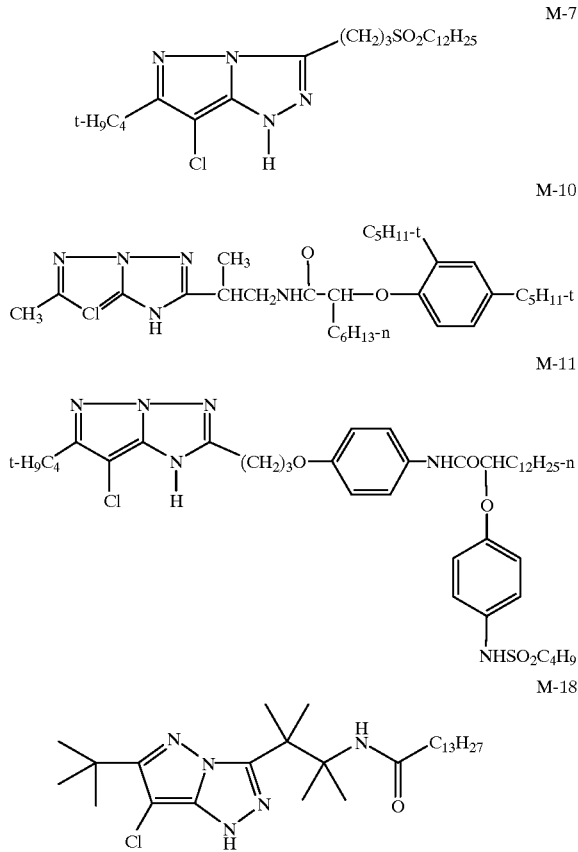

In order to successfully transport display materials of the invention, the reduction of static caused by web transport through manufacturing and image processing is desirable. Since the light sensitive imaging layers of this invention can be fogged by light from a static discharge accumulated by the web as it moves over conveyance equipment such as rollers and drive nips, the reduction of static is necessary to avoid undesirable static fog. The polymer materials of this invention have a marked tendency to accumulate static charge as they contact machine components during transport. The use of an antistatic material to reduce the accumulated charge on the web materials of this invention is desirable. Antistatic materials may be coated on the web materials of this invention and may contain any known materials in the art which can be coated on photographic web materials to reduce static during the transport of photographic paper. Examples of antistatic coatings include conductive salts and colloidal silica. Desirable antistatic properties of the support materials of this invention may also be accomplished by antistatic additives which are an integral part of the polymer layer. Incorporation of additives that migrate to the surface of the polymer to improve electrical conductivity include fatty quaternary ammonium compounds, fatty amines, and phosphate esters. Other types of antistatic additives are hygroscopic compounds such as polyethylene glycols and hydrophobic slip additives that reduce the coefficient of friction of the web materials. An antistatic coating applied to the opposite side of the image layer or incorporated into the backside polymer layer is preferred. The backside is preferred because the majority of the web contact during conveyance in manufacturing and photoprocessing is on the backside. The preferred surface resistivity of the antistat coat at 50% RH is less than $10^{13}$ ohm/square. A surface resistivity of the antistat coat at 50% RH is less than $10^{13}$ ohm/square has been shown to sufficiently reduce static fog in manufacturing and during photoprocessing of the image layers.

In the following Table, reference will be made to (1) Research Disclosure, December 1978, Item 17643, (2) Research Disclosure, December 1989, Item 308119, and (3) Research Disclosure, September 1996, Item 38957, all published by Kenneth Mason Publications, Ltd., Dudley Annex, 12a North Street, Emsworth, Hampshire PO10 7DQ, ENGLAND. The Table and the references cited in the Table are to be read as describing particular components suitable for use in the elements of the invention. The Table and its cited references also describe suitable ways of preparing, exposing, processing and manipulating the elements, and the images contained therein.

| Reference | Section | Subject Matter |
|---|---|---|
| 1 | I, II | Grain composition, |
| 2 | I, II, IX, X, XI, XII, XIV, XV I, II, III, IX | morphology and preparation. Emulsion preparation including hardeners, coating aids, addenda, etc. |
| 3 | A & B | |
| 1 | III, IV | Chemical sensitization and |
| 2 | III, IV | spectral sensitization/ |
| 3 | IV, V | desensitization. |
| 1 | V | UV dyes, optical brighteners, |
| 2 | V | luminescent dyes |
| 3 | VI | |
| 1 | VI | |
| 2 | VI | Antifoggants and stabilizers |
| 3 | VII | |
| 1 | VIII | |
| 2 | VIII, XIII, XVI | Absorbing and scattering materials; Antistatic layers; |
| 3 | VIII, IX C & D | matting agents |
| 1 | VII | Image-couplers and image- |
| 2 | VII | modifying couplers; Dye |
| 3 | X | stabilizers and hue modifiers |
| 1 | XVII | |
| 2 | XVII | Supports |
| 3 | XV | |
| 3 | XI | Specific layer arrangements |
| 3 | XII, XIII | Negative working emulsions; Direct positive emulsions |
| 2 | XVIII | Exposure |
| 3 | XVI | |
| 1 | XIX, XX | |
| 2 | XIX, XX, XXII | Chemical processing; Developing agents |
| 3 | XVIII, XIX, XX | |
| 3 | XIV | Scanning and digital processing procedures |

The photographic elements can be exposed with various forms of energy which encompass the ultraviolet, visible, and infrared regions of the electromagnetic spectrum as well as with electron beam, beta radiation, gamma radiation, x-ray, alpha particle, neutron radiation, and other forms of corpuscular and wave-like radiant energy in either noncoherent (random phase) forms or coherent (in phase) forms, as produced by lasers. When the photographic elements are intended to be exposed by X Rays, they can include features found in conventional radiographic elements.

The photographic elements are preferably exposed to actinic radiation, typically in the visible region of the spectrum, to form a latent image, and then processed to form a visible image, preferably by other than heat treatment. Processing is preferably carried out in the known RA-4™ (Eastman Kodak Company) Process or other processing systems suitable for developing high chloride emulsions.

The following examples illustrate the practice of this invention. They are not intended to be exhaustive of all possible variations of the invention. Parts and percentages are by weight unless otherwise indicated.

EXAMPLES

Example 1

In this example, a imaging support material was constructed by laminating a top and bottom biaxially oriented polymer sheet to cellulose paper. Sample 1 of this example (control), used standard extrusion lamination process conditions without sheet heating or cooling where the biaxially oriented sheets are laminated to the paper base using melt extruded polyethylene. Sample 2 of this example (invention), used a heated roll to thermally expand the bottom biaxially oriented polymer sheet just prior to melt extrusion lamination. This example will show that thermally expanding the bottom biaxially oriented sheet significantly improved the curl of the imaging support.

The following laminated photographic base was prepared by extrusion laminating top and bottom biaxially oriented sheets to both sides of a photographic grade cellulose paper base.

Cellulose Paper Base

A photographic paper support was produced by refining a pulp furnish of 50% bleached hardwood kraft, 25% bleached hardwood sulfite, and 25% bleached softwood sulfite through a double disk refiner, then a Jordan conical refiner to a Canadian Standard Freeness of 200 cc. To the resulting pulp furnish was added 0.2% alkyl ketene dimer, 1.0% cationic cornstarch, 0.5% polyamide-epichlorohydrin, 0.26 anionic polyacrylamide, and 5.0% $TiO_2$ on a dry weight basis. An about 227 $g/m^2$ (46.5 lbs. per 1000 sq. ft. (ksf)) bone dry weight base paper was made on a fourdrinier paper machine, wet pressed to a solid of 42%, and dried to a moisture of 10% using steam-heated dryers achieving a Sheffield Porosity of 160 Sheffield Units and an apparent density 0.70 g/cc. The paper base was then surface sized using a vertical size press with a 10% hydroxyethylated cornstarch solution to achieve a loading of 3.3 wt. % starch. The surface sized support was calendered to an apparent density of 1.04 gm/cc. The base paper was 0.142 mm thick with a MD Modulus of 6205 MPa and a MD to CD modulus ratio of 1.89.

Top Biaxially Oriented Polymer Sheet

A composite sheet (0.0356 mm thick, d=0.70 g/cc), consisting of a microvoided and oriented polypropylene core. The composite sheet consisted of 5 layers identified as L1, L2, L3, L4, L5. L1 is the thin colored layer on the outside of thetop sheet. L2 is the layer to which optical brightener and $TiO_2$ was added. The optical brightener used was Hostalux KS manufactured by Ciba-Geigy. The rutile $TiO_2$ used was DuPont R104 (a 0.22 $\mu$m particle size $TiO_2$). L3 was a microvoided polypropylene core. L4 and L5 consisted of solid polyproplyene. The CD (Cross Direction) Modulus was 2758 MPa and CD to MD (Machine direction) modulus ratio was 1.85.

Bottom Biaxially Oriented Sheet

The bottom biaxially oriented sheet laminated to the back side of photographic bases A and B was a one-side matte finish, one-side treated biaxially oriented polypropylene sheet (25.6 $\mu$m thick) (d=0.90 g/cc) consisting of a solid oriented polypropylene layer and a skin layer of a block copolymer of polyethylene and a terpolymer comprising ethylene, propylene and butylene. The skin layer was on the bottom and the polypropylene layer was laminated to the paper. The bottom sheet was 0.0178 mm thick with CD Modulus of 4000 MPa and CD to MD modulus ratio of 1.85.

Adhesive tie layers were used to attach the sheets to the base paper, and each thickness was 0.0114 mm. The tie layers did not have a high Modulus compared to the sheets or base paper, but the spacing must be accounted for when designing the package because the location of the oriented polypropylene sheets with respect to the base paper can change the overall stiffness. The adhesive used was an extrusion grade low density (d=0.92 $g/cm^3$) polyethylene.

Figure 3:
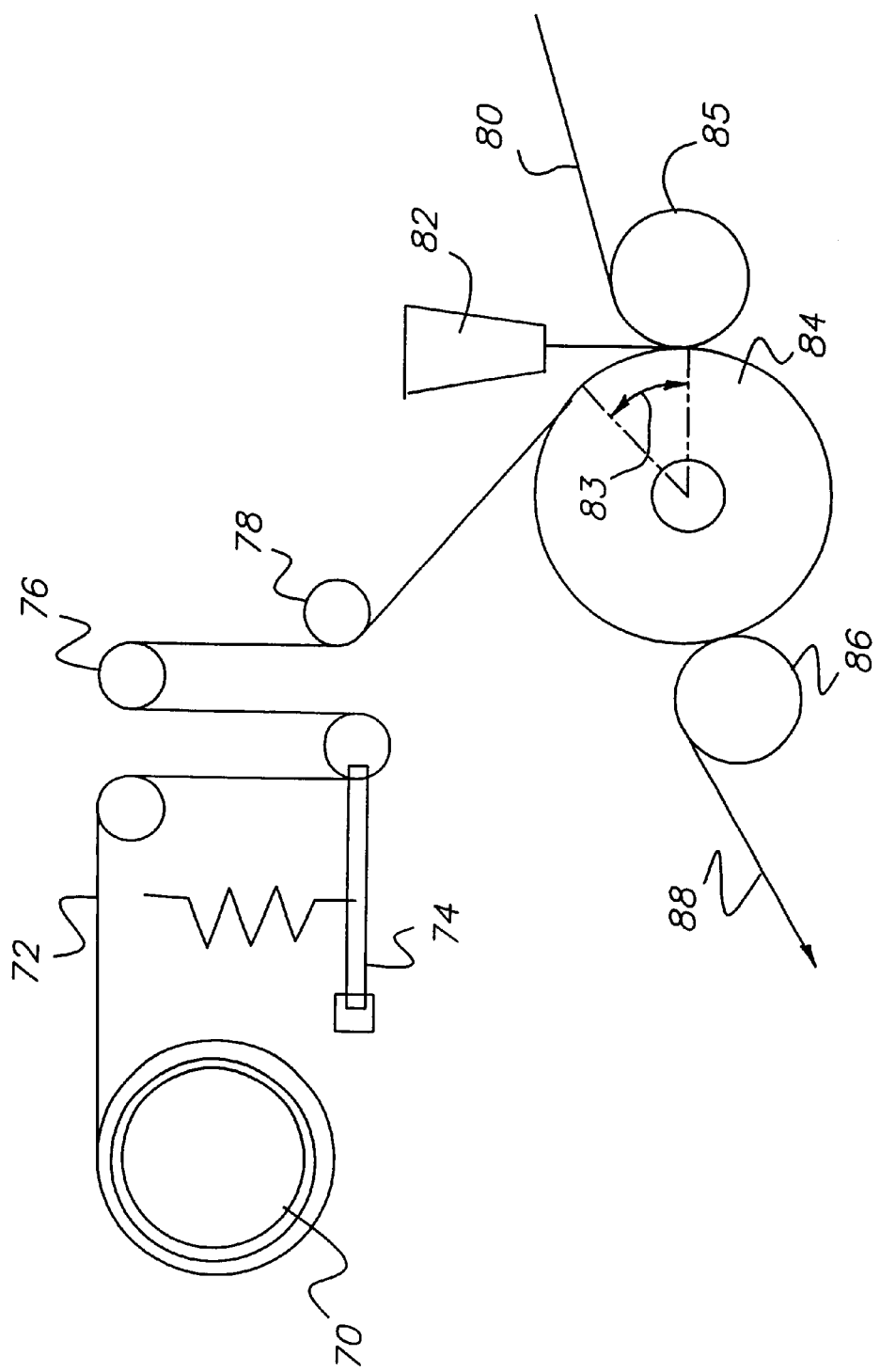
FIG. 3 is an illustration for Example 1 showing the heating arrangement for the bottom biaxially oriented sheet used in the Example.

For Sample 1 (control), the top and bottom sheets were applied in a standard lamination configuration as shown in FIG. 3 but there was no heating or cooling of the top and bottom sheets.

Sample 2 (invention) used the film heating system shown in FIG. 3 with the process settings listed in Table 1. The bottom biaxially oriented sheet 72 is unwound from a wide roll 70. The biaxially oriented sheet is transported through tension control device 74. The bottom biaxially oriented sheet 72 is transported by conveyance rollers 76 and 78. The bottom biaxially oriented sheet 72 is laminated to cellulose paper base 80 with melt extruded polyethylene from slit die 85. The lamination occurs in the pressure nip created by heated roll 84 and pressure roller 85. The one sided laminated cellulose paper 88 is stripped from heated roll 84 by stripping roll 86 and exits the lamination process. The lamination process in FIG. 3 thermally expanded the bottom biaxially oriented sheet prior to lamination. The preheating of the bottom sheet was the only process change from Sample 1 (control).

TABLE 1

| Description of experimental feature | Value | Units |
|---|---|---|
| Bottom sheet temperature-start | 24 | Deg C |
| Bottom sheet thermal expansion coefficient | 1.1 E-04 | mm/mm deg C |
| Water Temp Figure3, roll (84) | 57.2 | Deg C |
| Cooling Roll Diameter Figure3, roll (84) | 610 | mm |
| Wrap Angle Figure 3, feature (83) | 45 | Degrees |
| Line Speed | 130 | meter/min |
| Tension for film at Figure3, feature (74) | 0.088 | newtons/mm |
| Heat transfer coefficient , top sheet to drum | 5.258 E + 4 | joule/min $m^2$ Deg C |
| Dwell Time on Heating Roll Figure3, roll (84) | 0.10 | seconds |

After top sheet lamination, sample 1 and sample 2 were measured for support curl. Curl values are the measurement amount of deflection in a parabolically deformed sample. An 8.5 cm diameter round sample of the composite is stored at the test humidity for 21 days. The amount of time required depends on the vapor barrier properties of the laminates applied to the moisture sensitive paper base, and it should be adjusted as necessary by determining the time to equilibrate the weight of the sample in the test humidity. The curl readings are expressed in ANSI curl units, specifically, 100 divided by the radius of curvature in inches. The radius of curvature is determined by visually comparing the curled shape, sighting along the axis of curl, with standard curves in the background. The curl may be positive or negative, and for imaging supports, the usual convention is that the positive direction is curling towards the imaging layer. The mean curl value for ten samples along with the bottom sheet temperature just prior to lamination is listed in Table 2.

TABLE 2

|  | Sample1 | Sample2 |
| --- | --- | --- |
| Temperature of bottom film at attachment | 22 deg C | 56.5 deg C |
| Curl measurement at room temperature | +15 | −2 |

The purpose of this example was to improve the curl of a laminated imaging support by changing the curl from highly positive to approximately flat. The curl was unbalanced in Sample 1 as the top sheet was much thicker and, when assembled with all layers at room temperature, it was an unbalanced design. The invention used a 0.111 second dwell time on a 610 mm heated roller at 57° C. and was able to expand the bottom biaxially oriented polymer sheet at assembly to provide enough shrinkage when the sample came to room temperature to bring the curl to nearly zero. This invention has significant commercial value in that the curl of a laminated support can be controlled during the lamination process. This allows the curl of the support to be changed for various imaging layer designs so that the net image curl is near zero. Prior art melt extruded polyethylene imaging supports require expensive modification of the support design to achieve a acceptable image curl. An example is the gelatin coating applied on the backside of prior art ink jet reflective paper. The purpose of this gelatin coating is to balance the image for curl and is expensive as extra materials and an additional coating operation are required.

The invention has been described in detail with particular reference to certain preferred embodiments thereof, but it will be understood that variations and modifications can be effected within the spirit and scope of the invention.

What is claimed is:

1. A method of imaging member curl control comprising providing a bottom polymer sheet, bringing said bottom sheet into contact with a heat source, providing core material, bringing said core material into contact with said bottom polymer sheet while simultaneously applying a binder between said bottom sheet and said core material to form a laminate, providing a top polymer sheet, bringing said top sheet into contact with said core material and while simultaneously applying a binder between said top sheet and said core material to form a composite including said laminate, and coating the top of said composite with at least one layer comprising a photographic silver halide photosensitive emulsion, drying said emulsion and recovering a flat imaging member wherein each sheet Young's modulus to core material Young's modulus ratio is greater than 1, said bottom sheet is heated with said heat source to a temperature greater than ambient temperature and below the glass transition temperature of said bottom sheet, said bottom sheet comprises biaxially oriented polyolefin sheet, said heating temperature is to between 32 and 100 degrees centigrade, and said top sheet is cooled to a temperature of between 16 and 2 degrees centigrade by bringing said top sheet into contact with a cooling roll.

2. The method of claim 1 wherein said heat source comprises a heated roller.

3. The method of claim 1 wherein said top sheet is at ambient temperature prior to said applying a binder between said top sheet and said core.

4. The method of claim 1 wherein said core material comprises paper.

5. The method of claim 1 wherein said top polymer sheet and bottom polymer sheet comprise biaxially oriented polyolefin sheet.

6. The method of claim 4 wherein said paper core material has a Young's modulus in the cross direction of between 1380 and 6900 MPa and a Young's modulus in the machine direction of between 2760 and 1380 MPa.

7. The method of claim 1 wherein said top and bottom sheets have a modulus of greater than 340 MPa.

8. The method of claim 1 wherein said top and bottom sheets have a coefficient of expansion of greater than 0.00001 mm/mm-degree centigrade.

9. The method of claim 1 wherein said top polymer sheet and bottom polymer sheet comprise biaxially oriented polyolefin sheet.

10. A method of imaging member curl control comprising providing a bottom polymer sheet, providing core material, bringing said core material into contact with said bottom polymer sheet while simultaneously applying a binder between said bottom sheet and said core material to form a laminate, providing a top polymer sheet, bringing said top sheet into contact with a cooling source, bringing said top sheet into contact with said core material and while simultaneously applying a binder between said top sheet and said core material to form a composite including said laminate, coating the top of said composite with at least one layer comprising a photographic silver halide photosensitive emulsion, drying said emulsion and recovering a flat imaging member, wherein each sheet Young's modulus to core material Young's modulus ratio is greater than 1, said cooling source comprises a cooled roller, said bottom sheet is at ambient temperature prior to applying a binder between said bottom sheet and said core, said top polymer sheet and bottom polymer sheet comprise biaxially oriented polyolefin sheet, said bottom sheet is heated to a temperature greater than ambient temperature and below the glass transition temperature of said bottom sheet during applying a binder between said bottom sheet and said core.

11. The method of claim 10 wherein said top and bottom sheets have a modulus of greater than 340 MPa.

12. The method of claim 10 wherein said top and bottom sheets have a coefficient of expansion of greater than 0.00001 mm/mm-degree centigrade.

13. The method of claim 10 wherein said heating temperature is to between 32 and 100 degrees centigrade.

14. The method of claim 10 wherein said top sheet is cooled to a temperature of between 16 and 2 degrees centigrade by bringing said sheet into contact with a cooling roll.

15. The method of claim 10 wherein said core comprises paper.

16. The method of claim 15 wherein said paper core material has a Young's modulus in the cross direction of between 1380 and 6900 MPa and a Young's modulus in the machine direction of between 2760 and 1380 MPa.

* * * * *